US011493771B2

(12) United States Patent
Gerdes et al.

(10) Patent No.: US 11,493,771 B2
(45) Date of Patent: Nov. 8, 2022

(54) NVIS COMPATIBLE HEAD-UP DISPLAY COMBINER ALIGNMENT DETECTOR

(71) Applicant: Rockwell Collins, Inc., Cedar Rapids, IA (US)

(72) Inventors: Joshua Gerdes, Aurora, OR (US); Carl Bycraft, Wilsonville, OR (US); Kurt A. Stahl, Portland, OR (US); Christopher A. Keith, Wilsonville, OR (US); Donald Graham, Keizer, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 643 days.

(21) Appl. No.: 16/593,445

(22) Filed: Oct. 4, 2019

(65) Prior Publication Data
US 2021/0341745 A1  Nov. 4, 2021

(51) Int. Cl.
  *G02B 27/14* (2006.01)
  *G02B 27/01* (2006.01)
  *G01B 7/00* (2006.01)
  *G01J 1/02* (2006.01)
  *G01J 1/42* (2006.01)
  (Continued)

(52) U.S. Cl.
  CPC ......... *G02B 27/0179* (2013.01); *G01B 7/003* (2013.01); *G01J 1/0214* (2013.01); *G01J 1/0238* (2013.01); *G01J 1/4204* (2013.01); *G01J 1/4228* (2013.01); *G01J 1/44* (2013.01); *G02B 27/0101* (2013.01); *B64D 43/00* (2013.01); *G01J 2001/4238* (2013.01); *G01J 2001/446* (2013.01); *G01J 2001/448* (2013.01); *G02B 2027/0118* (2013.01); *G02B 2027/0198* (2013.01)

(58) Field of Classification Search
  CPC . G02F 1/163; G02F 1/15; G02F 1/155; B32B 17/10513; B32B 2419/00; E06B 9/24; E06B 2009/2464; G05B 15/02; G05B 19/0426; G05B 2219/2628; G05B 2219/2642; G06F 3/0412; G06F 3/044; H01L 27/3234; H01L 51/52; H04K 3/45
  USPC .......................... 250/342; 359/630; 345/7–9
  See application file for complete search history.

(56) References Cited

U.S. PATENT DOCUMENTS 4,775,218 A  10/1988  Wood et al.
6,552,789 B1  4/2003  Modro
(Continued)

FOREIGN PATENT DOCUMENTS

WO  02091058 A1  11/2002
WO  2017042588 A1  3/2017

OTHER PUBLICATIONS

Extended Search Report for European Application No. 20200112.9 dated Feb. 23, 2021, 6 pages.

*Primary Examiner* — William Choi
(74) *Attorney, Agent, or Firm* — Suiter Swantz pc llo

(57) ABSTRACT

A system and method. The system may include a head-up display (HUD). The HUD may include a positionable combiner optical element (COE) and a combiner alignment detector (CAD) configured to conform images displayed on the positionable COE with a view through the positionable COE. The CAD may include a mirror that moves with the positionable COE, an infrared (IR) emitter configured to emit IR pulses onto the mirror with a duty cycle of less than 1% such that an average time-based radiance of the IR pulses is compatible with a night vision imaging system (NVIS), and an IR detector configured to receive the IR pulses reflected off of the mirror.

15 Claims, 15 Drawing Sheets

(51) Int. Cl.
    *G01J 1/44*          (2006.01)
    *B64D 43/00*     (2006.01)

(56) References Cited

U.S. PATENT DOCUMENTS

| | | |
|---|---|---|
| 7,319,219 B2 | 1/2008 | David et al. |
| 7,733,464 B2 | 6/2010 | David et al. |
| 9,148,579 B1 | 9/2015 | Schwartz |
| 9,977,247 B1 | 5/2018 | Brown et al. |
| 2014/0009611 A1 | 1/2014 | Hiebl et al. |

Field of View Through NVIS

NVIS COMPATIBLE HEAD-UP DISPLAY COMBINER ALIGNMENT DETECTOR

BACKGROUND

Combiners are used to combine symbology from a head-up display (HUD) projector with a pilot's field of view. In order for this symbology to be conformed to the outside world, the combiner should be in a very precise position. The position is monitored by a combiner alignment detector (CAD). Traditional methods of single or dual-axis alignment detection work by reflecting a beam of 850 nanometer (nm) infrared (IR) light off of a mirror which is attached to the combiner and onto a photodiode array which senses the location of the IR beam. The mirror steers the IR beam, so as the angle of the combiner (and attached mirror) changes, the IR beam shifts on the photodiode array. The traditional CAD is an "open air" design, meaning that the optical path is not enclosed, which may have the benefit over a closed design of not blocking some of a pilot's field of view. The use of 850 nm infrared light is advantageous because such emitters and detectors are readily available and the light is invisible to the unaided eye; however, traditional CADs with 850 nm IR light are incompatible with night vision imaging systems (NVISs) because NVIS goggles are sensitive to infrared light.

Traditional open air CADs use short-wavelength infrared LED emitters and detectors at modest brightness levels. Since short-wavelength infrared LED emitters are invisible to the human eye, the brightness was never a distraction or safety concern. NVIS, however, has high spectral sensitivity in the short-wavelength infrared. This spectral sensitivity makes the light emitted from open air IR emitters extremely noticeable as a distraction and safety concern. Stray infrared light from a traditional CAD scatters about the cockpit and can completely overwhelm the HUD symbology when viewed through NVIS goggles. Stray infrared light from a traditional CAD makes viewing symbology extremely difficult with NVISs due to IR light from the IR emitter being visible to the NVIS.

SUMMARY

In one aspect, embodiments of the inventive concepts disclosed herein are directed to a system. The system may include a head-up display (HUD). The HUD may include a positionable combiner optical element (COE) and a combiner alignment detector (CAD) configured to conform images displayed on the positionable COE with a view through the positionable COE. The CAD may include a mirror that moves with the positionable COE, an infrared (IR) emitter configured to emit IR pulses onto the mirror with a duty cycle of less than 1% such that an average time-based radiance of the IR pulses is compatible with a night vision imaging system (NVIS), and an IR detector configured to receive the IR pulses reflected off of the mirror.

In a further aspect, embodiments of the inventive concepts disclosed herein are directed to a method. The method may include: conforming images displayed on a positionable combiner optical element (COE) with a view through the positionable COE, wherein a mirror moves with the positionable COE; emitting IR pulses onto the mirror with a duty cycle of less than 1% such that an average time-based radiance of the IR pulses is compatible with a night vision imaging system (NVIS); and receiving, by an IR detector, the IR pulses reflected off of the mirror.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
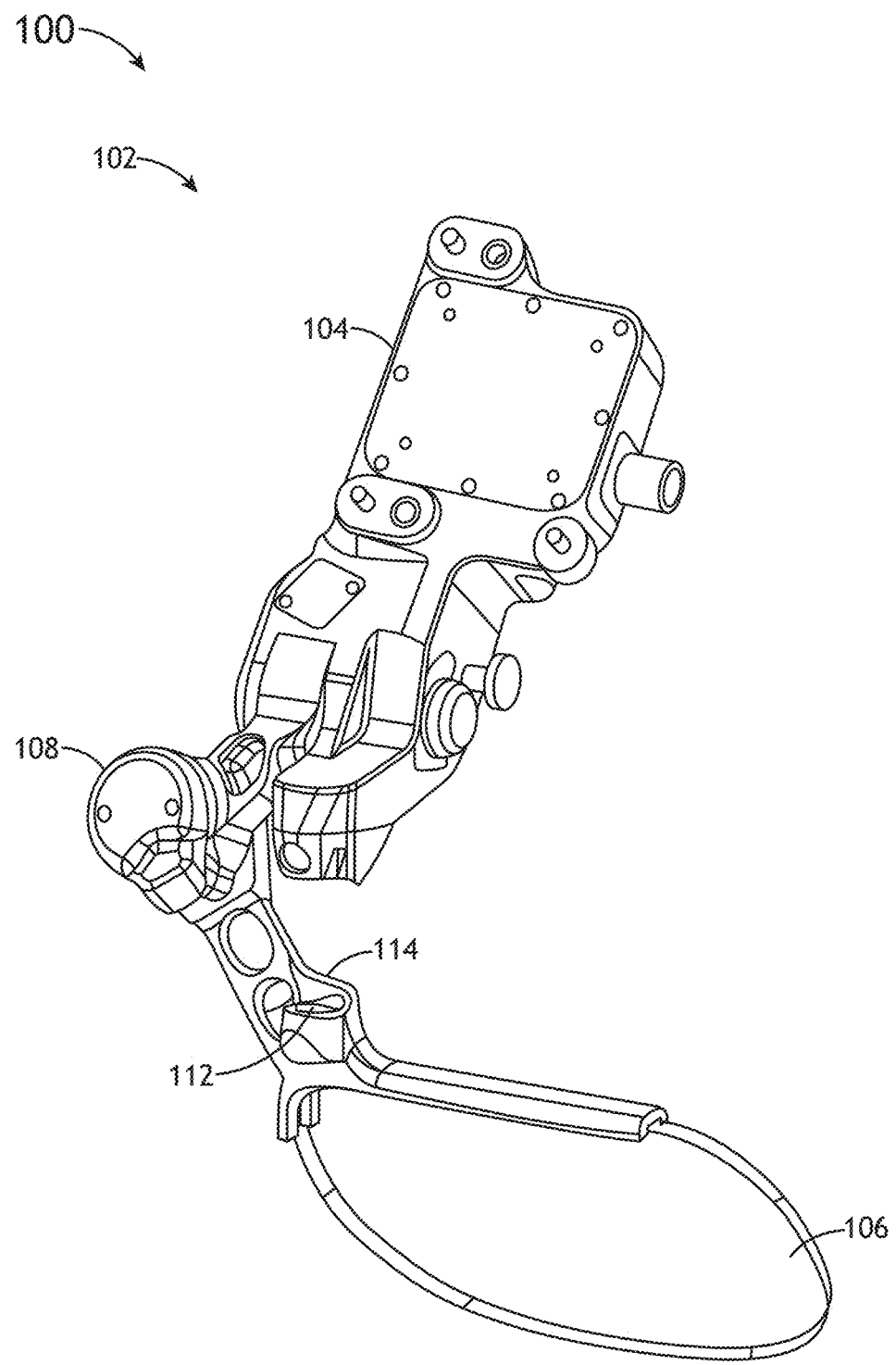
FIG. 1 is a view of an exemplary embodiment of a system including a HUD according to the inventive concepts disclosed herein.
Figure 2:
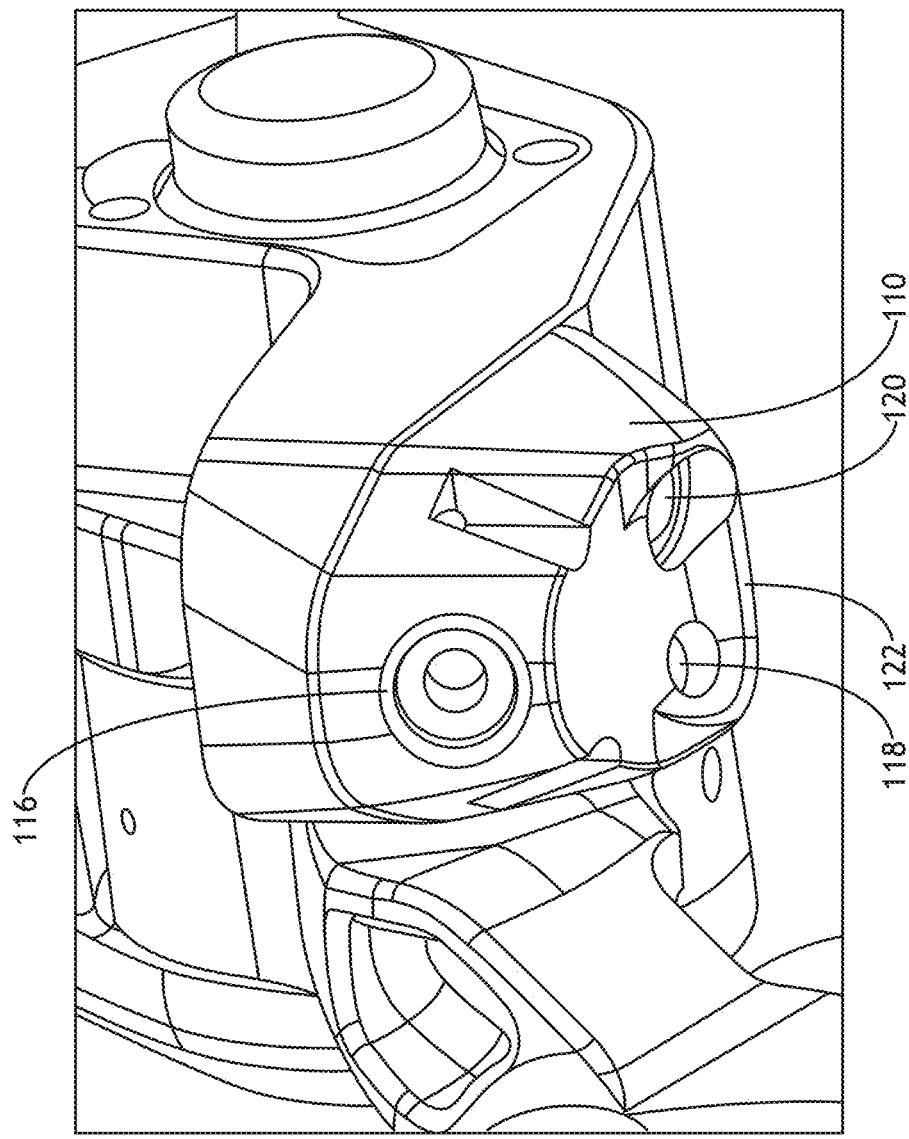
FIG. 2 is a further view of the HUD combiner of FIG. 1 according to the inventive concepts disclosed herein.
Figure 3:
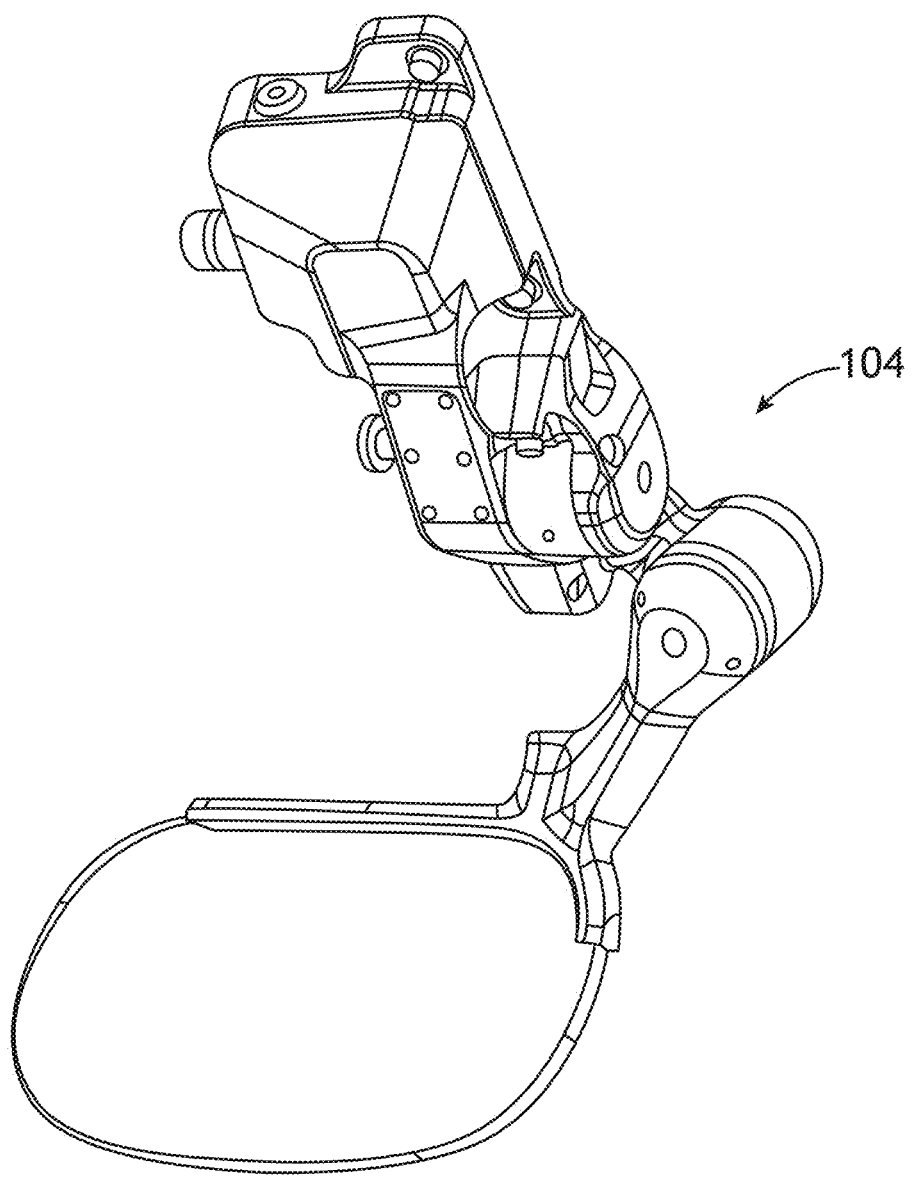
FIG. 3 is a further view of the HUD combiner of FIG. 1 according to the inventive concepts disclosed herein.
Figure 4:
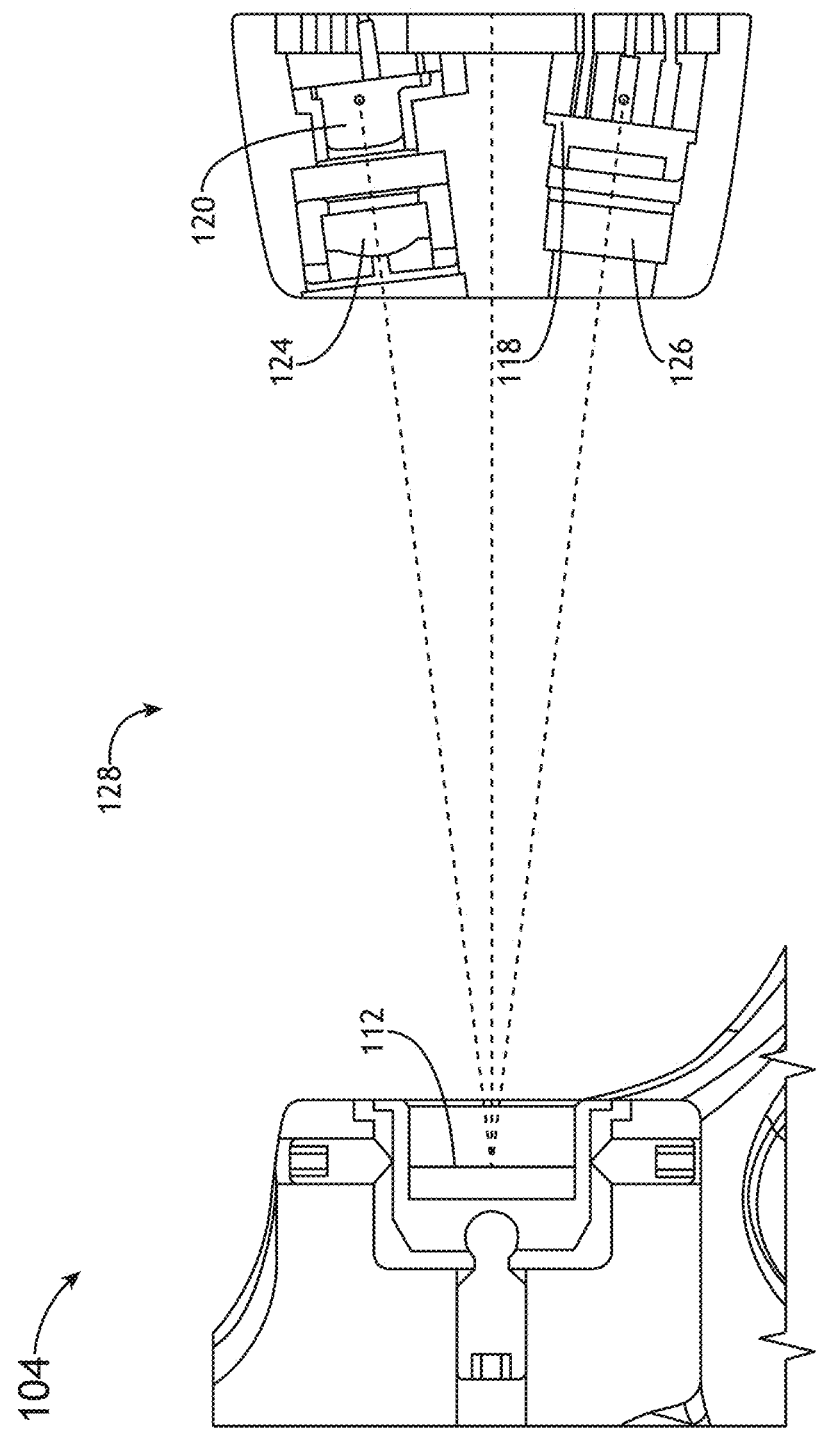
FIG. 4 is a further view of the HUD combiner of FIG. 1 according to the inventive concepts disclosed herein.
Figure 5:
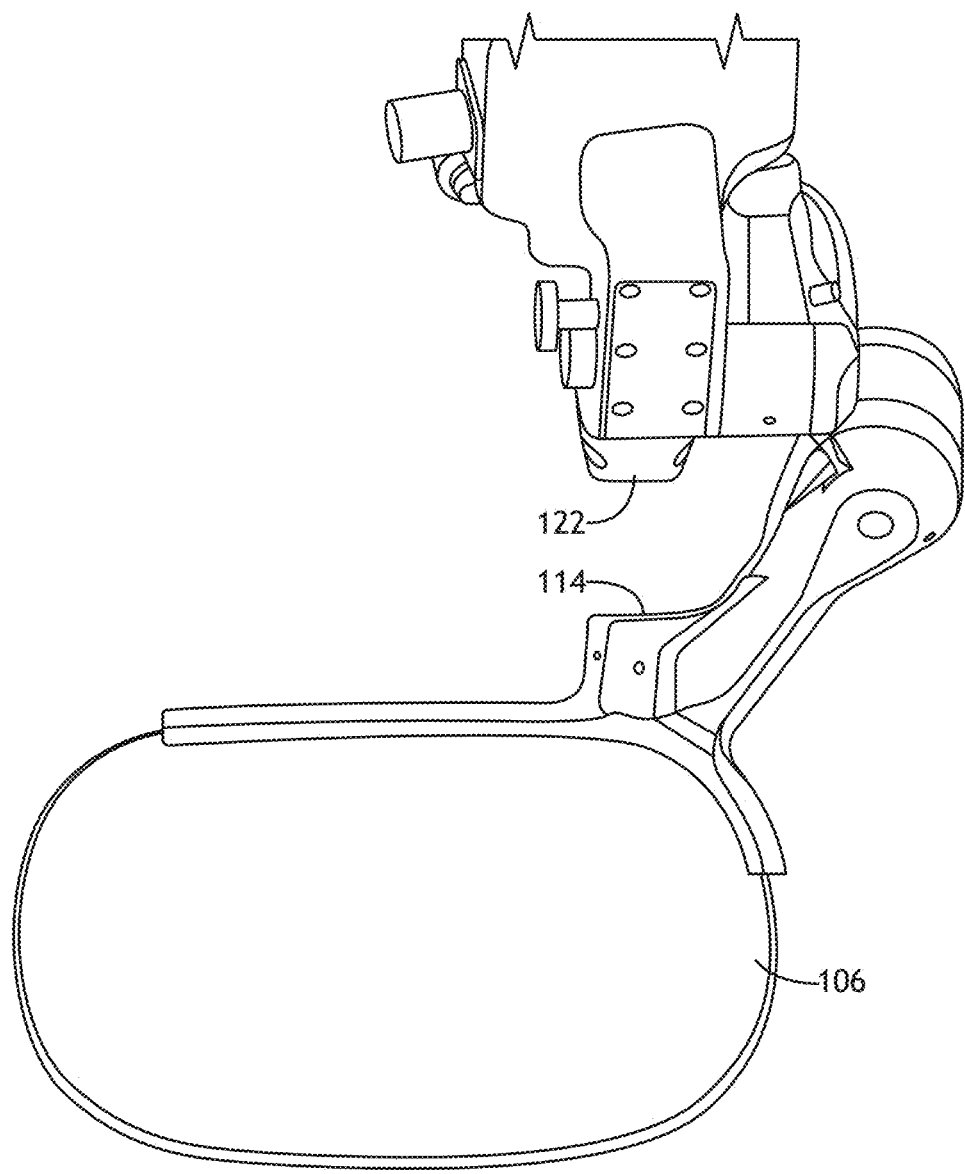
FIG. 5 is a further view of the HUD combiner of FIG. 1 according to the inventive concepts disclosed herein.
Figure 6:
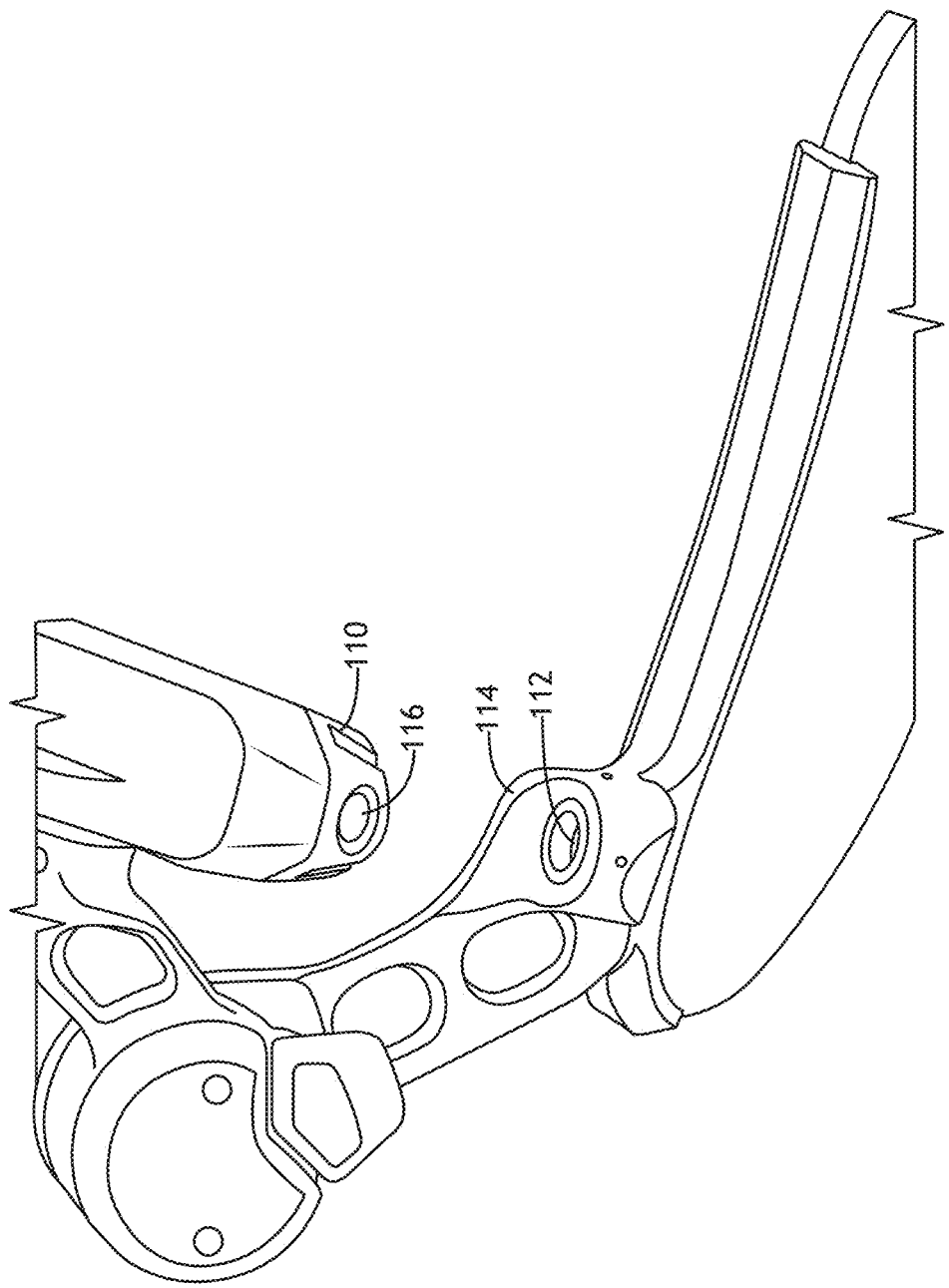
FIG. 6 is a further view of the HUD combiner of FIG. 1 according to the inventive concepts disclosed herein.
Figure 7:
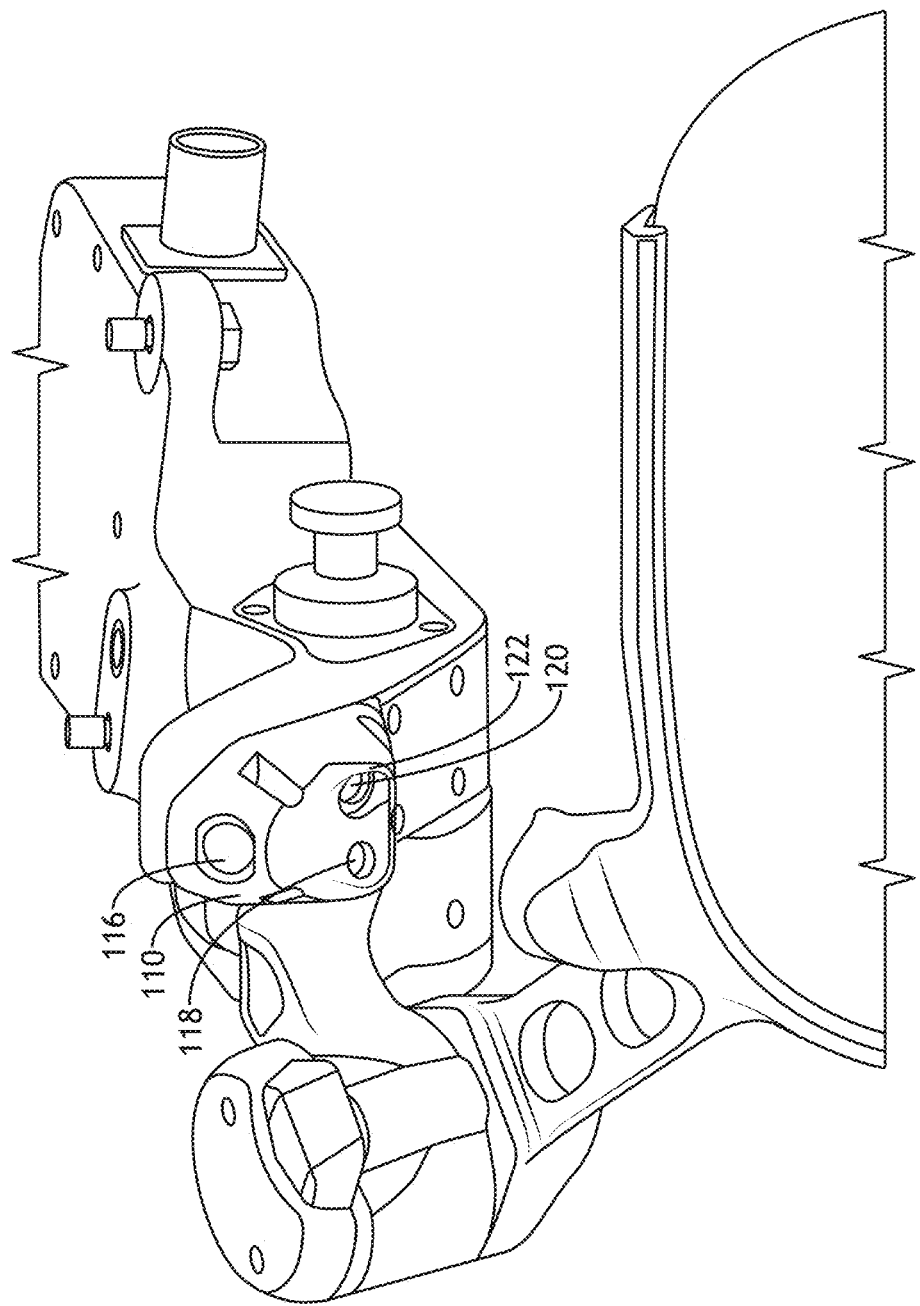
FIG. 7 is a further view of the HUD combiner of FIG. 1 according to the inventive concepts disclosed herein.
Figure 8:
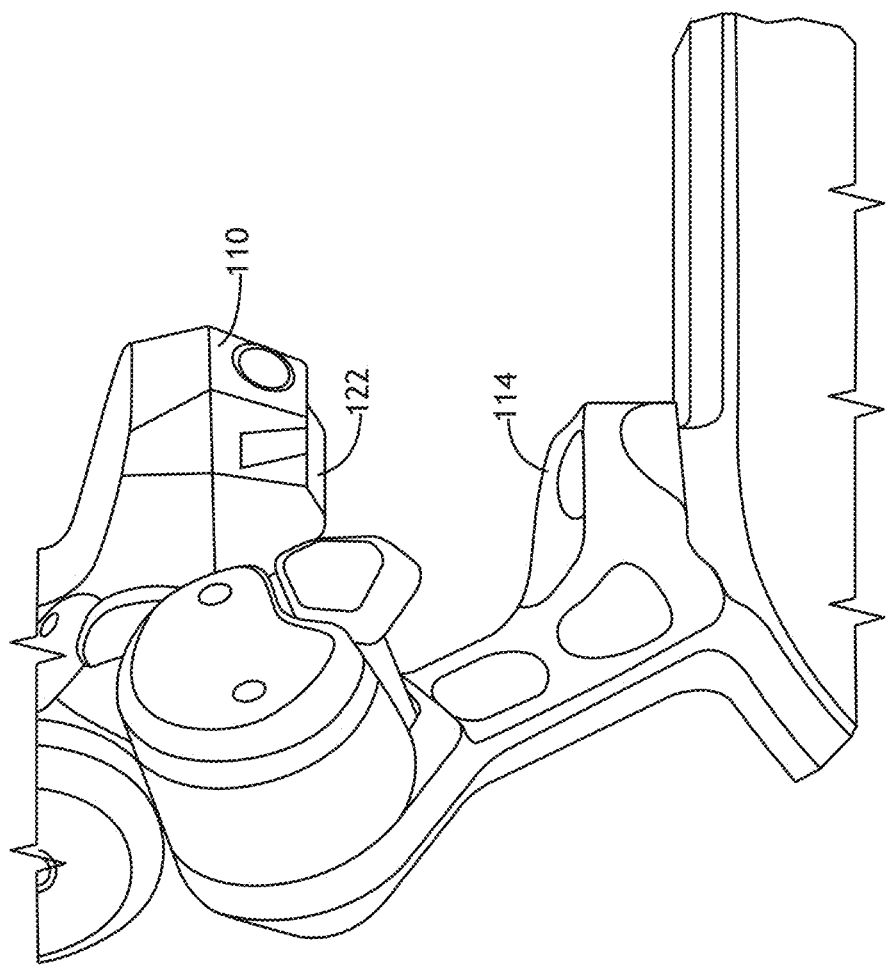
FIG. 8 is a further view of the HUD combiner of FIG. 1 according to the inventive concepts disclosed herein.
Figure 10:
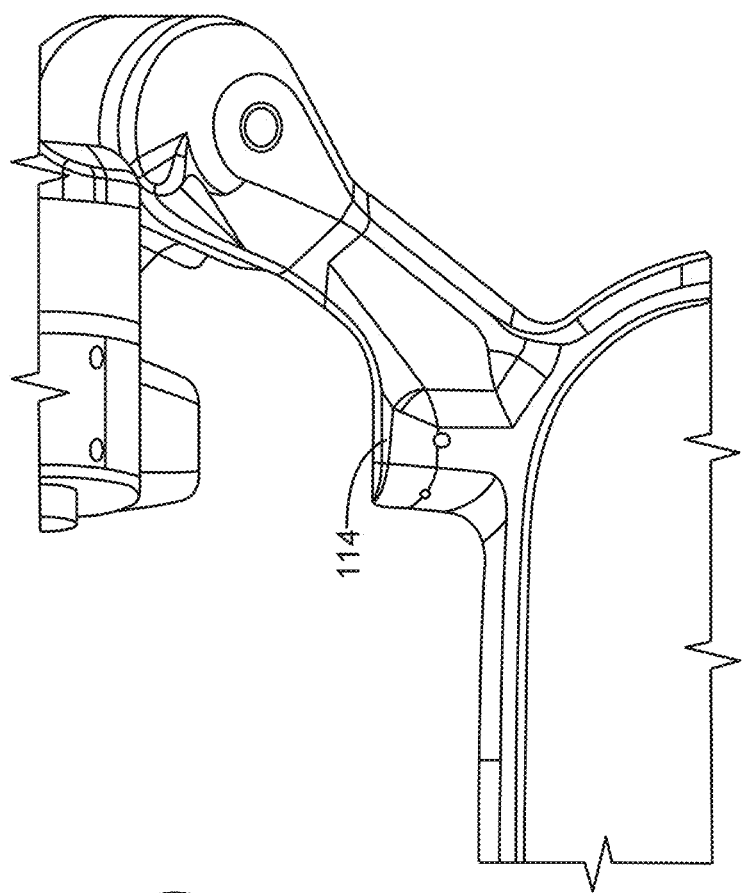
FIG. 10 is a further view of the HUD combiner of FIG. 1 according to the inventive concepts disclosed herein.
Figure 9:
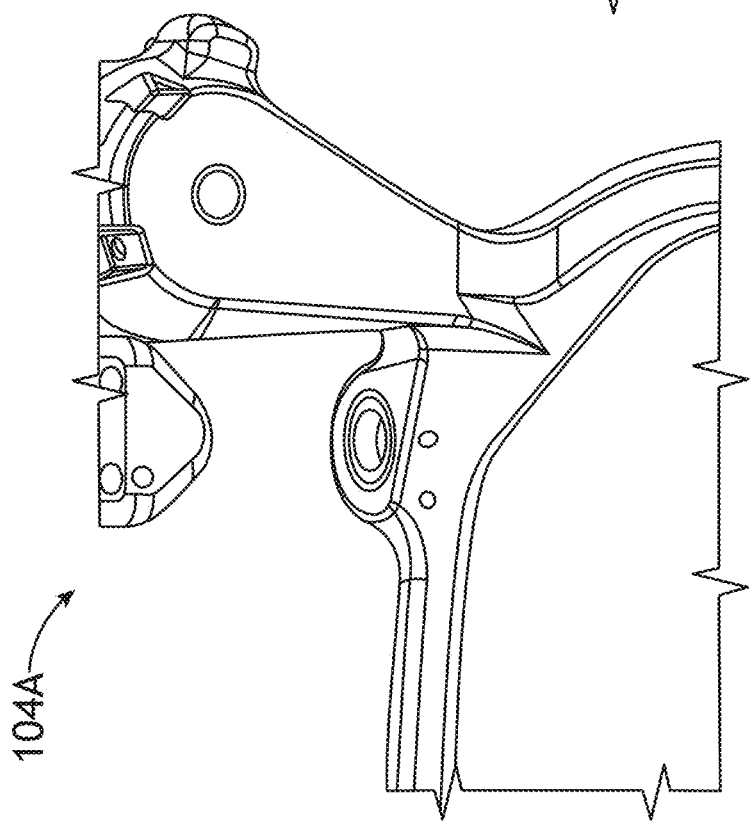
FIG. 9 is a further view of the HUD combiner of FIG. 1 according to the inventive concepts disclosed herein.
Figure 11:
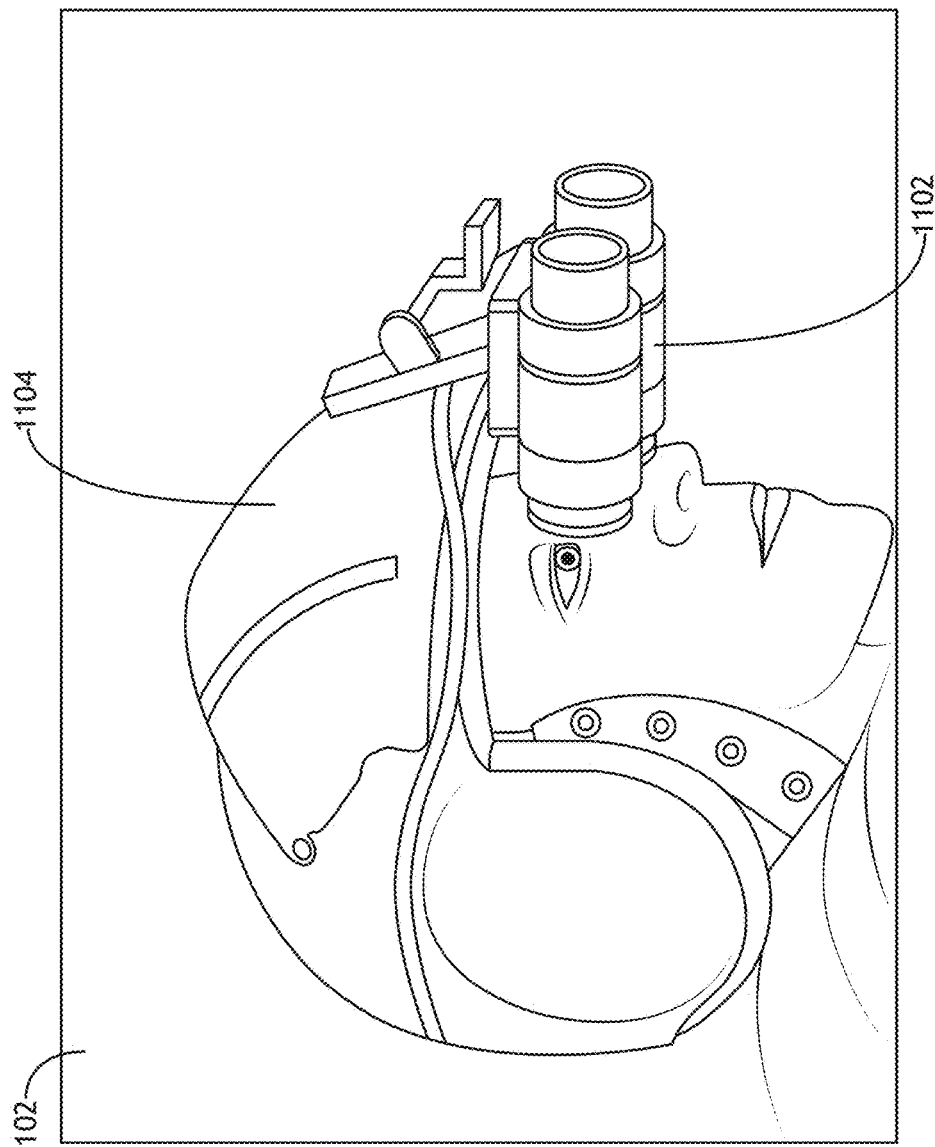
FIG. 11 is a view of an NVIS of the system of FIG. 1 according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method, whereby a CAD of a HUD may be compatible with an NVIS (e.g., night vision goggles). Some embodiments of combiner alignment detection allow for existing IR light emitting diode (LED) hardware to be compatible with an NVIS. In some embodiments, by decreasing the short-wavelength IR emitter duty cycle to low levels (e.g., extremely low levels, such as less than 2%, less than 1%, less than 0.1% less than 0.03%, and/or approximately 0.017%), existing open air CADs can become NVIS compatible when using the NVIS-compatible CAD system.

In some embodiments, to make the CAD compatible with NVIS, the CAD IR emitter may be pulsed at extremely low duty cycles to keep the averaged time-based IR radiance low enough such that the average radiance does not interfere with symbology and the ambient world when NVIS goggles are in use. By pulsing the CAD at low duty cycles, existing IR LED wavelengths that are visible in the NVIS spectrum can be used without impacting the overall opto-mechanical functionality and NVIS compatibility because the duty cycle of the real world and the duty cycle of the HUD display are so much longer than the duty cycle of the IR emitter that the NVIS performance may be dominated by the real world and display system.

In some embodiments, since the CAD is pulsed at a low duty cycle, the previous methods of time-averaged light regulation are not used to keep the IR radiance constant for position sensing. In some embodiments, during every pulse, the IR Emitter may be regulated to a precise radiance-level in a very short period of time. Pulse amplitude may be regulated via closed loop feedback within an on-time for each pulse, allowing for CAD position to be determined within the on-time of each pulse. For example, the IR emitter may be enabled for 5 microseconds (μs), and regulation and alignment detection may occur within about 2 μs, though any suitable durations may be used; in some embodiments this 5 μs pulse may only need to repeat only once every 30,000 μs, though any suitable duration may be used. In some embodiments, this operation may be compatible in both day and night since the same optical and electrical filtering is used for both ambient light conditions, and also, by using active feedback of the IR emitter and IR detector (e.g., an IR quadrant (quad) detector photodiode), the system may compensate for variation due to environmental effects. Some embodiments may allow the CAD to be temporarily switched back to a calibration mode (e.g., the traditional operating mode) for ease of CAD calibration and alignment during manufacturing, where high IR radiance may be helpful.

An exemplary embodiment may use active feedback and alignment detection in short 5 μs pulses over a 30 ms period which allows the CAD to be compatible with NVIS, while also maintaining all previous benefits of a CAD with active feedback, though any suitable pulse and period duration may be used.

Some embodiments may reduce non-recurring engineering (NRE) and recurring cost by using widely available 850 nm IR emitters and IR detector photodiode arrays. Some embodiments may reduce NRE cost and create re-use opportunities by enabling existing systems to be upgraded for NVIS compatible applications. Some embodiments may reduce weight by allowing an open air CAD to be used in a NVIS cockpit because open air CADs typically weigh less than enclosed CADs.

Some embodiments may include dimming the IR emitter to a very low average brightness through a low duty cycle pulse-width modulated (PWM) signal, such as a 5 μs pulse every 30 milliseconds (ms) (30,000 μs). Dimming the IR emitter may allow re-use of the same IR emitter and IR quadrant detector as traditional CADs. Additionally, the re-use of the sensors may remove temperature and opto-mechanical concerns. In some embodiments, dimming the IR emitter allows for the same Cartesian compensated quadrant (CCQ) benefits as a traditional CAD, which may include: output may still reference X & Y coordinates; CAD may still be regulated to compensate for variation due to component tolerance and environmental effects; and/or may still use 850 nm IR emitter and IR quadrant detector as a traditional CAD. In some embodiments, for NVIS compatibility, the CCQ method for alignment detection may be performed in a 5 μs window, while previous methods could be performed over multiple IR emitter pulses at high average IR emitter radiance.

Some embodiments have been tested from −40° C. to +70° C. for NVIS CAD operation, and NVIS CAD functions as designed across the temperature range with no observable change in oscilloscope readings. Some embodiments have been tested in direct sunlight, and such embodiments function as designed with no observable changes in oscilloscope readings.

Previous CAD systems used a time-averaged IR emitter signal to do calibration, alignment detection, and environmental/variation compensation. Some embodiments are configured to make the CAD compatible with NVIS by enabling the IR emitter for 5 µs every 30 ms (though any suitable duration may be used). In previous implementations, enabling the IR emitter for 5 µs every 30 ms would be too low of an averaged signal to do any sort of calibration, alignment detection, and environmental/variation compensation. In some embodiments, rather than using the direct current (DC) averaged signal from the IR emitter, the NVIS CAD may perform alignment detection and environmental/variation compensation within 2 µs of enabling the IR emitter, though any suitable duration may be used. The IR emitter may remain enabled for 5 µs to give alignment detection margin before latching the alignment state, though any suitable duration may be used. In some embodiments, the alignment state may be latched for 30 ms before the current alignment state is refreshed, though any suitable duration may be used.

Referring now to FIGS. 1-11, views of exemplary embodiments of a system according to the inventive concepts disclosed herein are depicted. In some embodiments, the system may be implemented as a vehicle (e.g., an aircraft 100), a vehicular system (e.g., an aircraft system), and/or a HUD system. For example, the system may include a cockpit 102, at least one HUD combiner 104, a user wearing a helmet 1104, and/or at least one NVIS (e.g., night vision goggles 1102), some or all of which may be communicatively coupled at a given time.

The HUD combiner 104 may be mounted in the cockpit 102. The HUD combiner 104 may include a positionable combiner optical element (COE) 106, at least one pivot joint 108, a housing 110, a mirror 112, at least one baffle 114, an ambient light sensor (ALS) photodiode 116, an IR detector 118 (e.g., an IR quadrant detector), an IR emitter 120, at least one baffle 122, at least one lens 124 (e.g., an adjustable lens), at least one filter 126 (e.g., a long-pass filter, such as a 800 nm long pass filter), at least one printed circuit board, and/or at least one circuit.

The positionable COE 106 may be configured to be positionable along at least one axis (e.g., one or two axes) via the at least one pivot joint 108. The positionable COE 106 may be configured to combine symbology from the HUD projector with a pilot's field of view.

A CAD 128 may include the housing 110, the mirror 112, the least one baffle 114, the ALS photodiode 116, the IR detector 118, the IR emitter 120, the at least one baffle 122, the at least one lens 124, the at least one filter 126, at least one printed circuit board, and/or at least one circuit. The CAD 128 may be configured to conform images displayed on the positionable COE 106 with a pilot's view through the positionable COE 106.

The housing 110 may house the ALS photodiode 116, the IR detector 118, and/or the IR emitter 120. In some embodiments, the housing 110 comprises the at least one baffle 122.

The mirror 112 may be configured to move with the positionable COE 106. For example, the mirror 112 may be installed on the positionable COE 106. The mirror 112 may be configured to reflect IR pulses received from the IR emitter 120 onto the IR detector 118.

The least one baffle 114 may at least partially obscure the mirror 112 and may be configured to reduce a scattering of IR light off of the mirror 112. The least one baffle 114 may reduce the amount of IR light in the cockpit and on the positionable COE 106 that the NVIS would detect. In some embodiments the baffle 114 may be omitted, such as shown on the HUD combiner 104A in FIG. 9.

The ALS photodiode 116 may allow the CAD 128 to compensate for environmental light in the cockpit 102. For example, if there is a reduction in signal to noise in the CAD 128 (e.g., when sunlight is streaming into the cockpit 102), the ALS photodiode 116 may sense a lighting environment in the cockpit 102, and the IR emitter 120 may be adjusted to provide more signal by adjusting amplitude and/or duty cycle of the pulses, and/or the IR detector 118 integration may be adjusted.

In some embodiments, the IR detector 118 may be an IR quadrant detector, such as an 850 nm IR quadrant detector. The IR detector 118 may be configured to receive the IR pulses reflected off of the mirror 112. In some embodiments, the filter 126 (e.g., an 800 nm long-pass filter) may be installed between the mirror 112 and the IR detector 118 to reduce the amount of solar radiation reaching the IR detector 118.

The IR emitter 120 may be configured to emit IR pulses onto the mirror 112 with a duty cycle of less than 2% (e.g., less than 1%, less than 0.1%, less than 0.03%, and/or approximately 0.017% (+/−0.0005%)) such that an average time-based radiance of the IR pulses is compatible with the NVIS. The IR emitter 120 may be an IR light emitting diode (LED) emitter. In some embodiments, the at least one lens 124 may be installed between the mirror 112 and the IR emitter 120 to focus a spot size of the IR pulses.

The at least one baffle 122 may at least partially obscure the IR emitter 120 and the IR detector 118 and may be configured to reduce a scattering of IR light from the IR emitter 120 and off of the IR detector 118. The least one baffle 122 may reduce the amount of IR light in the cockpit and on the positionable COE 106 that the NVIS would detect. In some embodiments the baffle 122 may be omitted.

Figure 13:
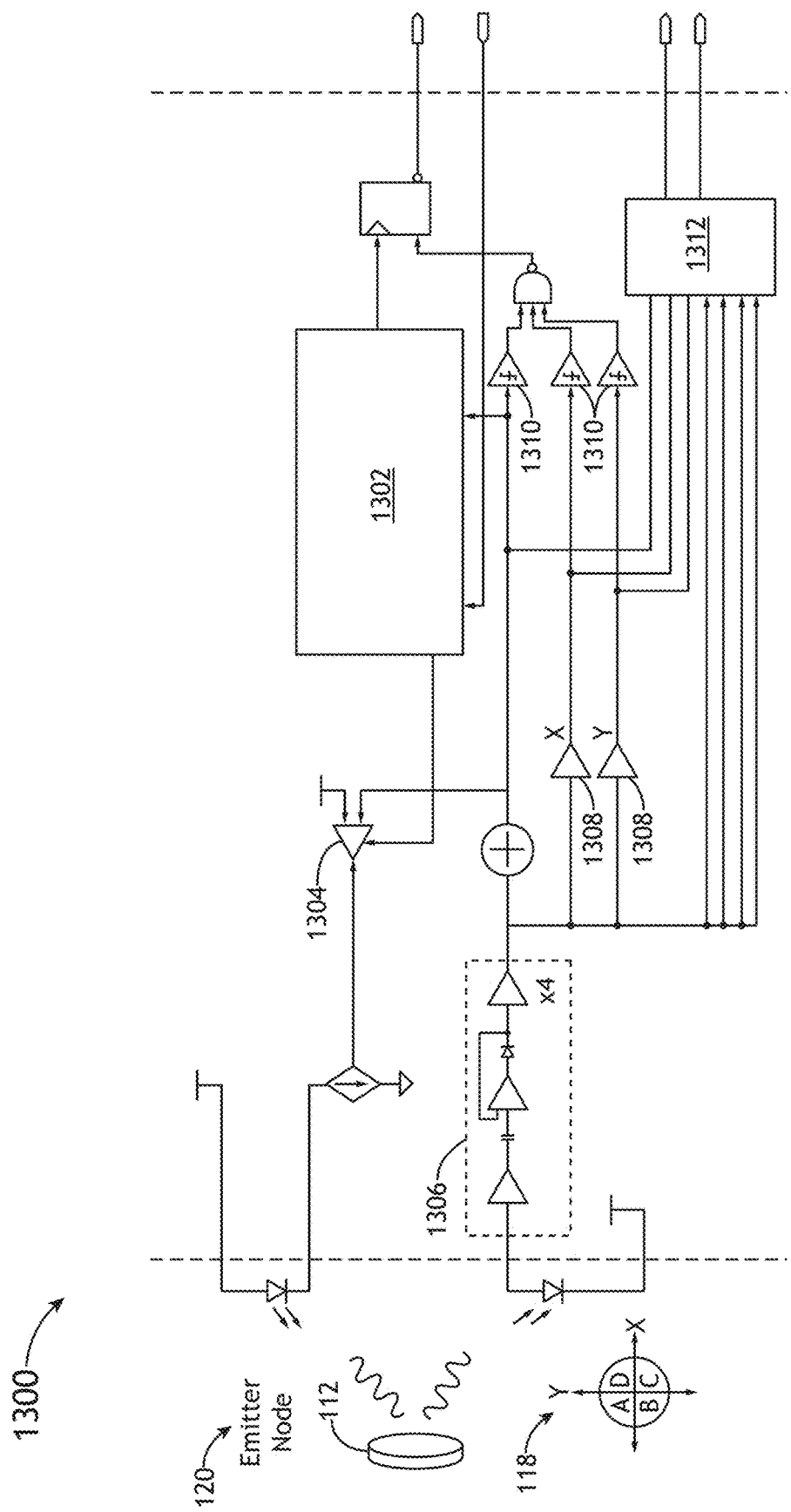
FIG. 13 is a view of an exemplary embodiment of the HUD combiner and/or the CAD of FIGS. 1-11 according to the inventive concepts disclosed herein.

In some embodiments, the CAD 128 and/or the HUD combiner 104 may include at least one printed circuit board (PCB) (e.g., 1300, as shown in FIG. 13). The at least one PCB may be communicatively coupled to the IR emitter 120, the IR detector 118, other electrical components of the HUD combiner 104, the CAD 128, and/or the system. The at least one PCB may include at least one circuit (e.g., an integrated circuit, at least one processor, at least one memory, at least one pulse generator, at least one amplifier (e.g., an error amplifier), at least one detection amplifier, at least one positional amplifier, at least one positional comparator, and/or at least one analog-to-digital converter (ADC)) installed on the at least one PCB. The at least one circuit may be configured to perform (e.g., collectively perform) any of the operations disclosed throughout.

In some embodiments, the NVIS (e.g., night vision goggles 1102) may be attached to the helmet 1104 and worn by a user (e.g., a pilot).

Figure 12:
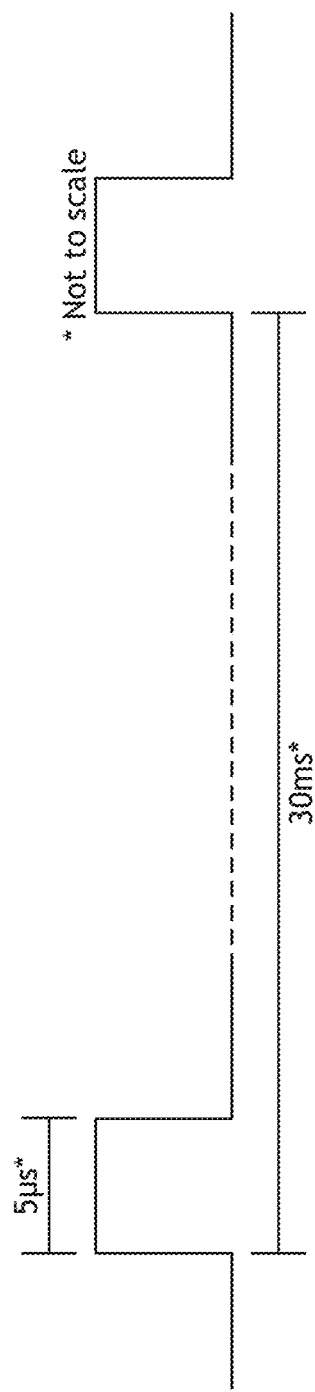
FIG. 12 is an exemplary graph of an IR emitter period according to the inventive concepts disclosed herein.

Referring now to FIG. 12, an exemplary graph of an IR emitter period according to the inventive concepts disclosed herein is depicted. The IR emitter 120 may be driven to emit an IR pulse for a duration of 5 µs over a 30 ms period such that an average time-based radiance of the IR pulse per period may be compatible with an NVIS. The periods may be repeated. In some embodiments, a duration of each of the IR pulses may be less than or equal to 10 µs. While the period and pulse duration are exemplarily described with respect to specific durations, in some embodiments, any suitable durations may be used.

Referring now to FIG. 13, a view of an exemplary embodiment of the HUD combiner 104 and/or the CAD 128 of FIGS. 1-11 according to the inventive concepts disclosed herein is depicted. The HUD combiner 104 and/or the CAD 128 may include at least one PCB 1300. The at least one PCB 1300 may be communicatively coupled to the IR emitter 120, the IR detector 118, other electrical components of the HUD combiner 104, the CAD 128, and/or the system. The at least one PCB 1300 may include at least one circuit. The at least one circuit may include an integrated circuit, at least one processor, at least one memory, at least one pulse generator 1302, at least one amplifier (e.g., an error amplifier 1304), at least one detection amplifier 1306 (e.g., four detection amplifiers 1306), at least one positional amplifier 1308 (e.g., two positional amplifiers 1308), at least one positional comparator 1310 (e.g., three positional amplifiers 1310), and/or at least one ADC 1312 installed on the at least one PCB 1300. The at least one circuit may be configured to perform (e.g., collectively perform) any of the operations disclosed throughout.

For example, the at least one circuit may be configured to collectively perform: drive the IR emitter 120 in an on state for a duration commensurate with the duty cycle; detect an alignment state during the on state of the IR emitter 120; and/or latch the alignment state for a duration of an off state of the IR emitter 120 until the IR emitter 120 is subsequently driven.

For example, the pulse generator 1302 may be configured to: pulse an IR emitter enable pulse to the error amplifier 1304 causing the error amplifier 1304 to drive the IR emitter 120 for a duration commensurate with the duty cycle; and/or pulse a sample pulse after the start of the IR emitter enable pulse and after an alignment state of the CAD 128 is captured but before a termination of the IR emitter enable pulse, the sample pulse causing the alignment state to be latched until a subsequent sample pulse is pulsed. For example, the pulse generator 1302 may be responsible for pulsing an enable pulse at a specific on-time at a predetermined rate. When the enable pulse is active, the error amplifier 1304 may drive the IR emitter 120. In a normal mode (e.g., where the duty cycle is less than 1%), the on-time of the enable pulse may be 5 microseconds and the rate may be 33.3 Hertz (Hz). In a calibration mode (e.g., an acceptance test procedure (ATP) mode), the on-time may be approximately 5 microseconds, but the rate may be 100 kHz. The pulse generator 1302 may also pulse a sample pulse 4 microseconds after the start of the 5 microsecond pulse. When the sample signal is asserted, the state of the alignment signal may be captured, driven out on aligned signal and held until the next sample pulse.

For example, the error amplifier 1304, when activated by the enable pulse, may throttle current through the IR emitter 120 to regulate the sum of the amplified quadrant signals equal to the reference of 4.096 Volts (V), though the reference voltage can be designed to be any other suitable value.

For example, each of the four detection amplifiers 1306 may be configured to amplify a signal from a particular quadrant of the IR quadrant detector 118. There may be one detection amplifier for each of the four quadrants (e.g., A, B, C, and D) of the IR quadrant detector 118. The four detection amplifiers 1306 may amplify the signal of the quadrant detector for use by the rest of the system.

For example, each of the positional amplifiers 1308 may be configured to determine an X or a Y coordinate location. The positional amplifiers 1308 may use the detection signals A, B, C, D to determine the X and Y coordinate locations by utilizing the following equations: $X=\frac{1}{2}*[(D+C)-(A+B)]+2.048$; $Y=\frac{1}{2}*[(A+D)-(B+C)]+2.048$.

For example, the positional comparators 1310 may be configured to determine whether the positionable COE 106 is in an aligned state. The positional comparators 1310 may detect whether the X and Y voltages are within a narrow window, which determines whether the COE 106 is in an aligned state. If the X and Y voltages are within the narrow window and the sum is properly regulated within its window, the aligned signal is driven.

For example, the ADC 1312 may be used during a CAD calibration mode (e.g., an acceptance test procedure (ATP) mode) where the IR emitter 120 and IR detector 118 are operated with a calibration duty cycle (e.g., 50%) larger than the duty cycle (e.g., less than 1%). The calibration mode may be used during manufacturing testing. Calibration mode may be enabled externally by a discrete signal, and pertinent CAD voltages can be read via the ADC 1312 during the calibration mode because calibration mode may operate on a time-averaged light mode.

Figure 14:
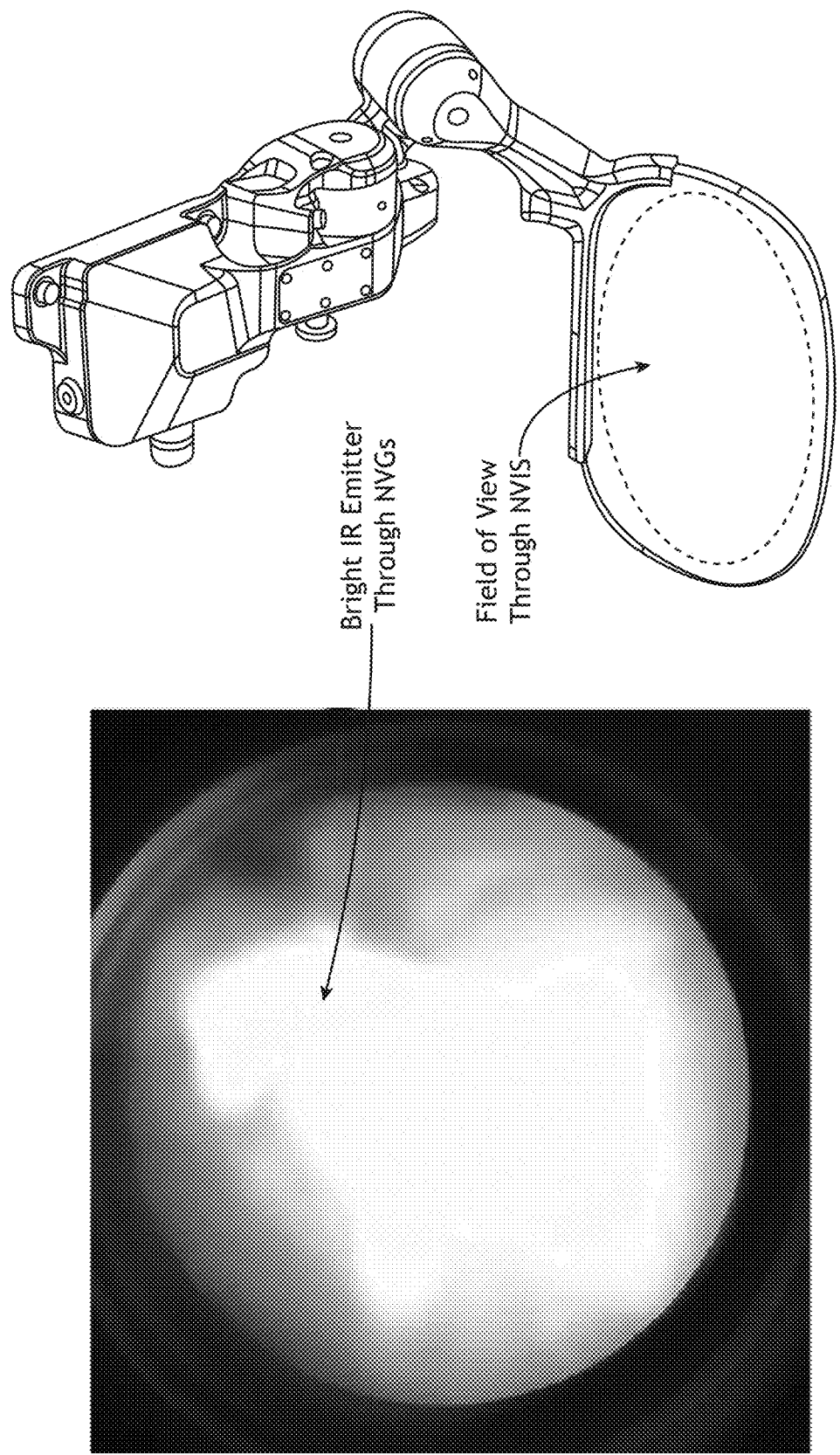
FIG. 14 is a view of a HUD combiner with a traditional CAD through an NVIS.

Referring now to FIG. 14, a view of a HUD with a traditional CAD through an NVIS is depicted. As can be seen, the IR light from the traditional CAD is detected by the NVIS and obscures the symbology displayed by the HUD.

Figure 15:
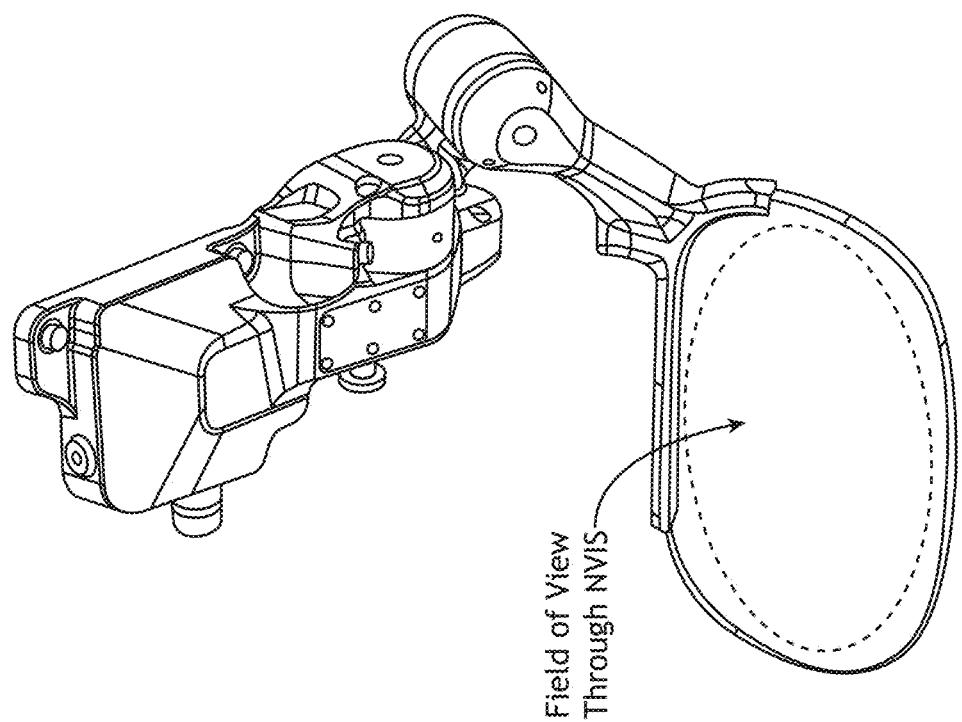
FIG. 15 is a view of the HUD combiner with the CAD of FIGS. 1-11 through the NVIS according to the inventive concepts disclosed herein.
Figure 15:
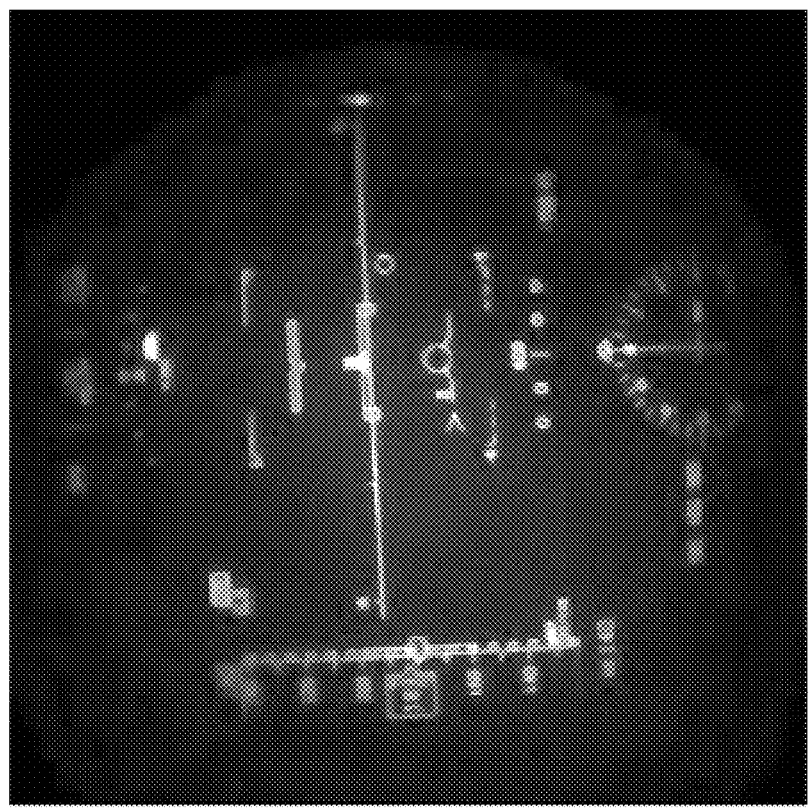

Referring now to FIG. 15, a view of the HUD combiner 104 with the CAD 128 of FIGS. 1-11 through the NVIS of an exemplary embodiment according to the inventive concepts disclosed herein is depicted. As can be seen, due to the dimmed average radiance of the IR light from the CAD 128, the symbology displayed by the HUD is visible through the NVIS.

Figure 16:
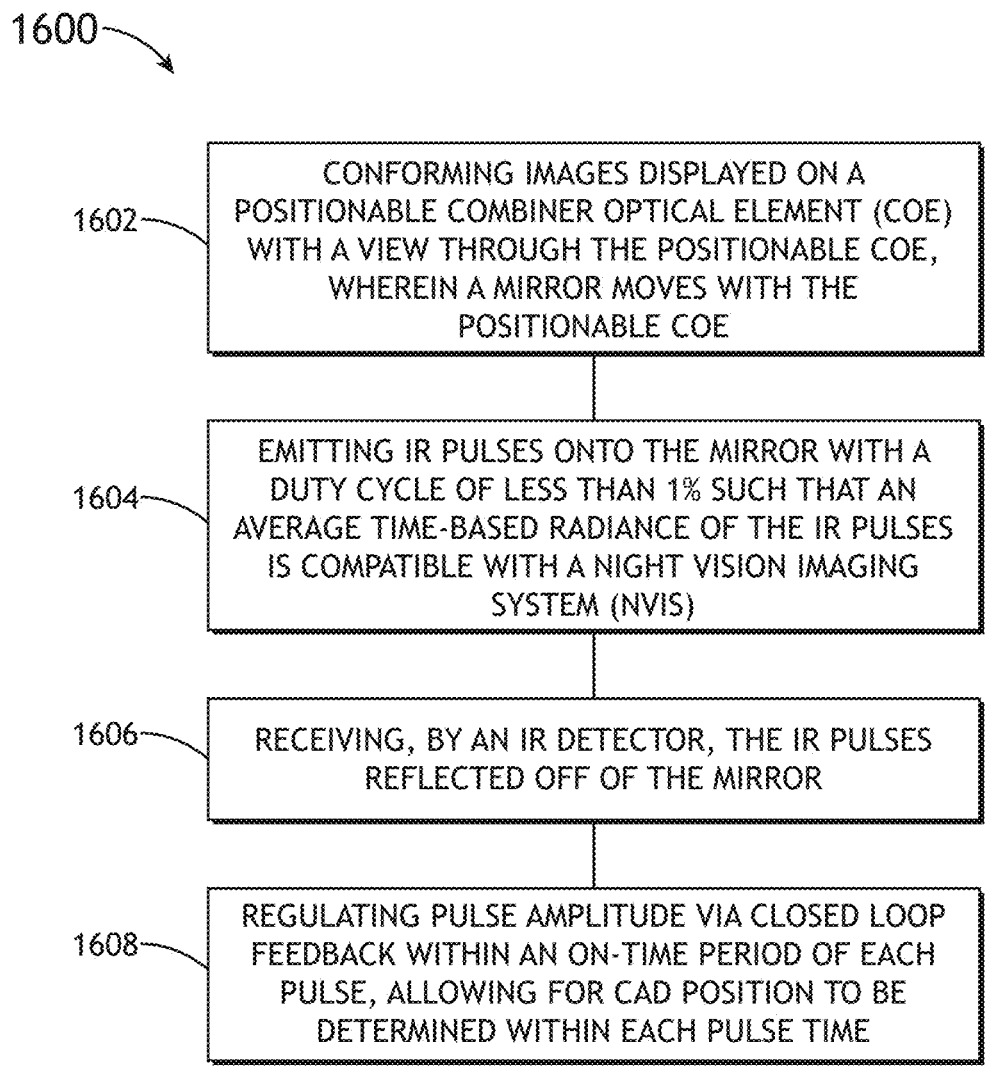
FIG. 16 is a diagram of an exemplary embodiment of a method according to the inventive concepts disclosed herein.

Referring now to FIG. 16, an exemplary embodiment of a method 1600 according to the inventive concepts disclosed herein may include one or more of the following steps. Additionally, for example, some embodiments may include performing one more instances of the method 1600 iteratively, concurrently, and/or sequentially. Additionally, for example, at least some of the steps of the method 1600 may be performed in parallel, in series, non-sequentially, and/or concurrently.

A step 1602 may include conforming images displayed on a positionable combiner optical element (COE) with a view through the positionable COE, wherein a mirror moves with the positionable COE.

A step 1604 may include emitting IR pulses onto the mirror with a duty cycle of less than 1% such that an average time-based radiance of the IR pulses is compatible with a night vision imaging system (NVIS).

A step 1606 may include receiving, by an IR detector, the IR pulses reflected off of the mirror.

A step 1608 may include regulating pulse amplitude via closed loop feedback within an on-time for each pulse, allowing for CAD position to be determined within the on-time of each pulse.

Further, the method 1600 may include any of the operations disclosed throughout.

As will be appreciated from the above, embodiments of the inventive concepts disclosed herein may be directed to a system and a method, whereby a CAD of HUD may be compatible with an NVIS (e.g., night vision goggles).

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a head-up display (HUD), comprising:
      a positionable combiner optical element (COE); and
      a combiner alignment detector (CAD) configured to conform images displayed on the positionable COE with a view through the positionable COE, the CAD comprising:
         a mirror that moves with the positionable COE;
         an infrared (IR) emitter configured to emit IR pulses onto the mirror with a duty cycle of less than 1% such that an average time-based radiance of the IR pulses is compatible with a night vision imaging system (NVIS); and
         an IR detector configured to receive the IR pulses reflected off of the mirror.

2. The system of claim 1, wherein the duty cycle is less than 0.1%.

3. The system of claim 1, wherein the duty cycle is less than 0.03%.

4. The system of claim 3, wherein a duration of each of the IR pulses is less than 10 microseconds.

5. The system of claim 1, wherein pulse amplitude is regulated via closed loop feedback within an on-time for each IR pulse, allowing for CAD position to be determined within the on-time of each IR pulse.

6. The system of claim 1, wherein the CAD further comprises at least one circuit, wherein the at least one circuit is configured to:
   drive the IR emitter in an on state for a duration commensurate with the duty cycle;
   detect an alignment state during the on state of the IR emitter; and
   latch the alignment state for a duration of an off state of the IR emitter until the IR emitter is subsequently driven.

7. The system of claim 1, wherein the CAD further comprises at least one circuit, wherein the at least one circuit comprises a pulse generator and an amplifier, wherein the pulse generator is configured to:
   pulse an IR emitter enable pulse to the amplifier causing the amplifier to drive the IR emitter for a duration commensurate with the duty cycle; and
   pulse a sample pulse after the start of the IR emitter enable pulse and after an alignment state of the CAD is captured but before a termination of the IR emitter enable pulse, the sample pulse causing the alignment state to be latched until a subsequent sample pulse is pulsed.

8. The system of claim 7, wherein the IR detector is an IR quadrant detector having four quadrants, wherein the at least one circuit further comprises four detection amplifiers, wherein each of the detection amplifiers is configured to amplify a signal from a particular quadrant of the IR quadrant detector.

9. The system of claim 8, wherein the at least one circuit further comprises positional amplifiers, wherein each of the positional amplifiers is configured to determine an X or a Y coordinate location.

10. The system of claim 9, wherein the at least one circuit further comprises positional comparators, wherein the positional comparators are configured to determine whether the positionable COE is in an aligned state.

11. The system of claim 10, wherein the at least one circuit further comprises an analog-to-digital converter (ADC), wherein the ADC is configured to be used during a CAD calibration mode where the IR emitter and IR detector are operated with a calibration duty cycle larger than the duty cycle.

12. The system of claim 1, wherein the CAD further comprises an ambient light sensor (ALS) photodiode allowing the CAD to compensate for environmental light.

13. The system of claim 1, wherein the CAD further comprises a baffle at least partially obscuring the mirror and configured to reduce a scattering of IR light off of the mirror.

14. The system of claim 1, wherein the CAD further comprises at least one baffle at least partially obscuring the IR emitter and the IR detector and configured to reduce a scattering of IR light from the IR emitter and off of the IR detector.

15. A method, comprising:
- conforming images displayed on a positionable combiner optical element (COE) with a view through the positionable COE, wherein a mirror moves with the positionable COE;
- emitting IR pulses onto the mirror with a duty cycle of less than 1% such that an average time-based radiance of the IR pulses is compatible with a night vision imaging system (NVIS); and
- receiving, by an IR detector, the IR pulses reflected off of the mirror.

* * * * *